(12) United States Patent
Reimann et al.

(10) Patent No.: US 6,318,109 B1
(45) Date of Patent: Nov. 20, 2001

(54) LOW PROFILE EVAPORATOR CABINET

(75) Inventors: Robert C. Reimann, LaFayette, NY (US); David Sloat, Rightsville, PA (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/651,189

(22) Filed: Aug. 30, 2000

(51) Int. Cl.[7] .................................................. F25D 17/04
(52) U.S. Cl. .......................... 62/317; 62/244; 62/298; 62/419; 62/426
(58) Field of Search ............................. 62/244, 298, 419, 62/426, 317

(56) References Cited

U.S. PATENT DOCUMENTS

| | | | |
|---|---|---|---|
| 4,607,497 | * 8/1986 | Ferdows et al. | 62/179 |
| 4,888,959 | * 12/1989 | Brown | 62/244 |
| 4,898,003 | * 2/1990 | Ichikawa et al. | 62/244 |
| 4,926,655 | * 5/1990 | King | 62/244 |
| 4,958,504 | * 9/1990 | Ichikawa et al. | 62/244 |
| 5,579,649 | * 12/1996 | Kim | 62/239 |
| 5,588,305 | * 12/1996 | Sim | 62/419 |
| 5,860,288 | * 1/1999 | Morimoto et al. | 62/244 |
| 6,105,383 | * 8/2000 | Reimann et al. | 62/285 |

* cited by examiner

Primary Examiner—William C. Doerrler
Assistant Examiner—Mark S. Shulman
(74) Attorney, Agent, or Firm—Wall Marjama & Bilinski

(57) ABSTRACT

A low profile evaporator unit suitable for mounting on the ceiling of a small bus. The unit includes a cabinet containing an evaporator coil and a return air intake opening in the floor of the cabinet. A blower is mounted in the cabinet directly over the opening. A grill is non-removably mounted over the floor opening and a filter receiving tray is integrally joined to the grill so that the grill forms the bottom wall of the tray. Limited access is provided to the tray such that an air filter can pass into and out of the tray without removing the grill from the housing. Elongated narrow slits are also provided in the grill which further restrict access to the interior of the cabinet.

9 Claims, 3 Drawing Sheets

LOW PROFILE EVAPORATOR CABINET

FIELD OF THE INVENTION

This invention relates generally to an improved evaporator unit for use in a confined space, such as the passenger compartment of a small bus wherein the unit can be damaged accidentally or maliciously by individuals occupying the confined space.

BACKGROUND OF THE INVENTION

In a pending U.S. patent application Ser. No. 09/393,562, there is disclosed a ceiling mounted evaporator cabinet that is ideally suited for use in the passenger compartment of a small bus. The housing contains an air inlet located in the floor of the cabinet through which return air from the compartment is drawn into the housing by a tangential blower wheel. The wheel is mounted directly over the air inlet opening and is arranged to direct the incoming air flow over an evaporator coil to condition the air. The conditioned air is then directed out of the front wall of the cabinet back into the passenger compartment.

Because the passenger compartment of a small mini-bus is relatively confined, the passengers can have ready access to the evaporator cabinet and, in particular, to the floor mounted air inlet grill. Foreign objects can be inserted upwardly through the grill into the blower wheel causing damage to the unit and potentially to the person inserting the foreign object into the blower. Most inlet grill to evaporator units are also easily removable so that an air filter, which is typically mounted between the inlet grill, can be periodically replaced when it has become contaminated with dust and dirt. Here again, an easily removable grill can be accidentally or maliciously displaced exposing the blower wheel and other internal components of the housing to potential damage.

SUMMARY OF THE INVENTION

It is therefore an object of the present invention to improve evaporator housings and, in particular, evaporator housings mounted upon the ceiling of the passenger compartment of a small bus.

It is a further object of the present invention to prevent an evaporator cabinet that is mounted in a confined space such as the passenger compartment of a small bus from being accidentally or maliciously damaged by one or more of the occupants.

A still further object of the present invention is to prevent easy access to the interior of an evaporator cabinet.

Another object of the present invention is to restrict access to the interior of an evaporator cabinet through a floor mounted air inlet grill.

Still another object of the present invention is to allow insertion and removal of an air filter over the air inlet grill of a low profile evaporator cabinet without having to detach the grill from the cabinet.

These and other objects of the present invention are attained in a low profile evaporator unit of the type generally mounted on the ceiling of the passenger compartment of a small bus. The unit is contained in a cabinet that houses an evaporator coil and has a floor containing an air inlet opening. A transverse blower wheel is mounted in the cabinet over the air inlet opening for drawing compartment air into the cabinet and directing the air over the evaporator coil to condition the air. The conditioned air is then returned to the passenger compartment through an outlet duct generally located in a front or side wall of the cabinet. A non-removable air inlet grill is mounted in the air inlet opening of the cabinet which denies ready access to the interior of the cabinet. The cabinet contains a small access opening through which an air filter can be passed into or out of a receiving tray located over the grill. The grill is arranged to form the floor of the receiving tray and contains elongated narrow slits which prevents small objects from passing upwardly through the grill into the blower region.

BRIEF DESCRIPTION OF THE DRAWING

For a further understanding of these and other objects of the present invention, reference will be made to the following detailed description of the invention which is to be read in connection with the accompanying drawing, wherein.

DETAILED DESCRIPTION OF THE INVENTION

Figure 1:
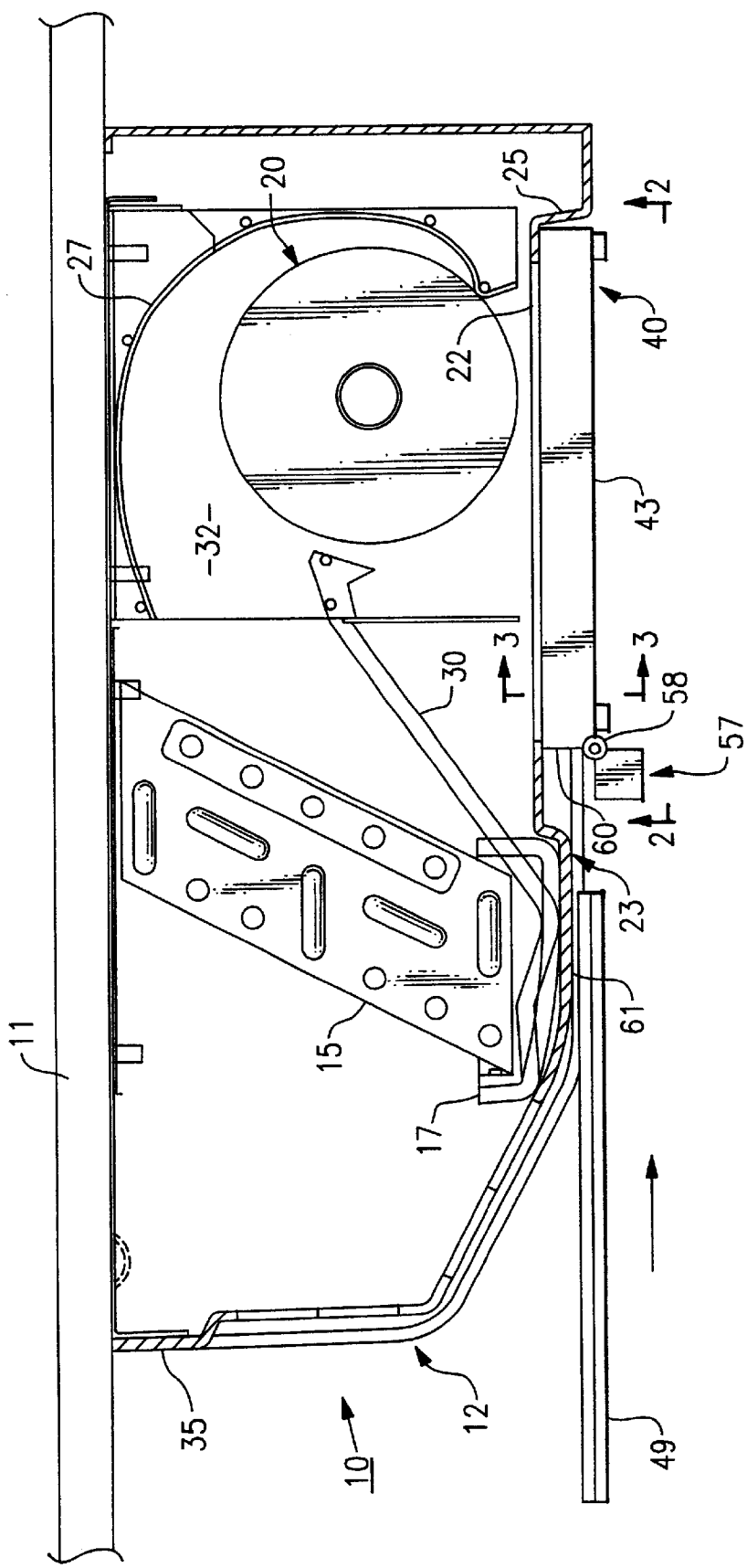
FIG. 1 is a side elevation in section of an evaporator unit embodying the teachings of the present invention.
Figure 2:
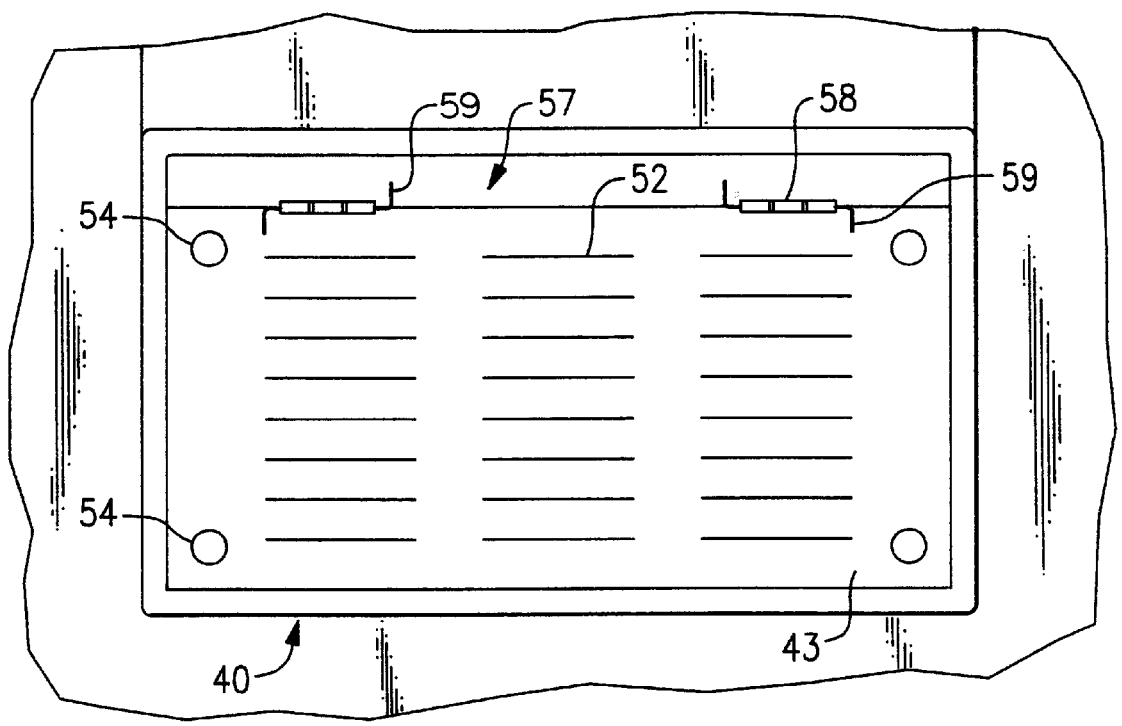
FIG. 2 is a partial enlarged bottom view of the air inlet grill assembly taken along lines 2—2 in FIG. 1 showing the air intake grill of the unit in further detail.
Figure 3:
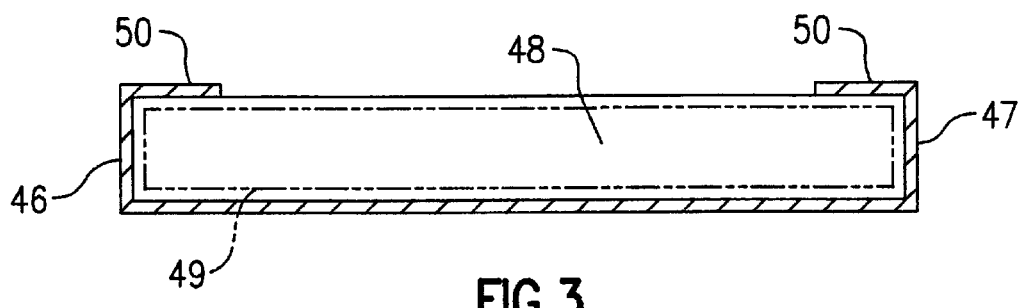
FIG. 3 is a section taken along lines 3—3 in FIG. 1 showing the construction of the grill assembly in further detail.

Referring initially to FIGS. 1—3, there is illustrated a low profile evaporator unit, generally referenced 10, that is mounted upon the ceiling 11 of a confined space such as the passenger compartment of a mini-bus that is generally populated by people who can readily come in physical contact with the cabinet 12 of the unit. Accordingly, the unit may be damaged by accident or by vandalism. As noted above, compact ceiling mounted evaporator cabinets for small buses have been devised wherein the return air intake is located in the floor of the cabinet well within reach of passengers in the bus. As a consequence, the passengers can readily access the interior of the unit through the air intake unless special precautions are taken.

An evaporator coil 15 is mounted at an inclined angel within the cabinet and a drip pan 17 is mounted beneath the coil to collect condensate which is removed from the bus by means of a drain system (not shown). Mounted behind the evaporator coil toward the rear of the cabinet is a blower wheel 20 that extends laterally across the width of the cabinet. A return air opening 22 is provided in the floor 23 of the cabinet within a recessed floor section 25. A shroud 27 encompasses a portion of the blower wheel and act in concert with an inclined baffle 30 to direct return air into the blower wheel. The air is discharged from the blower through the exit region 32 so that it passes over the evaporator coil and is thus conditioned. The conditioned air is then passed out of the cabinet via an exhaust air duct 35 located in the front wall of the cabinet which directs the comfort air flow along the ceiling of the passenger compartment.

A grill assembly, generally designated 40 in FIG. I is mounted directly beneath the air inlet opening 22 in the floor recess 25. The assembly includes an inlet grill 43 (FIGS. 2 and 3) that forms the bottom wall of an air filter tray 45. The tray includes a pair of side walls 46 and 47 along with a back wall 48 that raises upwardly, perpendicularly to the grill to create a three-sided structure for slidably receiving an air filter 49 therein.

Preferably, the grill and the three-sides of the tray are fabricated from a single sheet of metal whereby all sides of the tray are integral with the grill. The top edges of the two side walls 46 and 47 are turned inwardly parallel to the grill to create tabs 50–50 that extend along the length of the tray. The front of the tray is open so that the filter can be passed into and out of the tray through the open end thereof. The tabs are elevated a sufficient distance above the top of the grill to form a guideway for the filter. The filter is registered over the grill when the filter moves over the guideway into abutting contact against the back wall of the tray.

As illustrated in FIG. 2, the grill 43 contains a series of elongated slits 52 that are aligned in rows so that a sufficient amount of air can be drawn into the cabinet to meet the demands of the evaporator when operating at full capacity. The slits are sufficiently narrow, however, so that a person's finger or slender objects like pencils or pens cannot be passed upwardly into the blower regions. Preferably, the slits should be about between $3/8$" and $1/2$" in width.

In assembly, the grill assembly is connected to the bottom wall of the cabinet by four rivets 54 located at each corner of the grill and which serve to prevent ready removal of the assembly from the cabinet. This, coupled with the narrow slit openings in the grill combine to discourage people from attempting to gain entry into the cabinet and prevent the passing of foreign objects upwardly into the blower region. A door 57 is secured by hinges 58 located along one edge of the grill at the open end of the tray. The door, which is shown in an open position in FIG. 1, is provided with a torsion springs 59 that surrounds the hinge pins to normally urge and hold the door in a closed position over the entrance to the tray. When open as shown, the air filter 49 can pass into the tray through the tray entrance 60 and moved along the guideway into contact with the back wall of the tray. A portion 61 of the bottom wall of the cabinet can be used to direct the filter into the tray entrance as shown in FIG. 1. Once the filter is registered against the back wall of the tray, the door closes over the tray entrance under the influence of the torsion springs.

Figure 4:
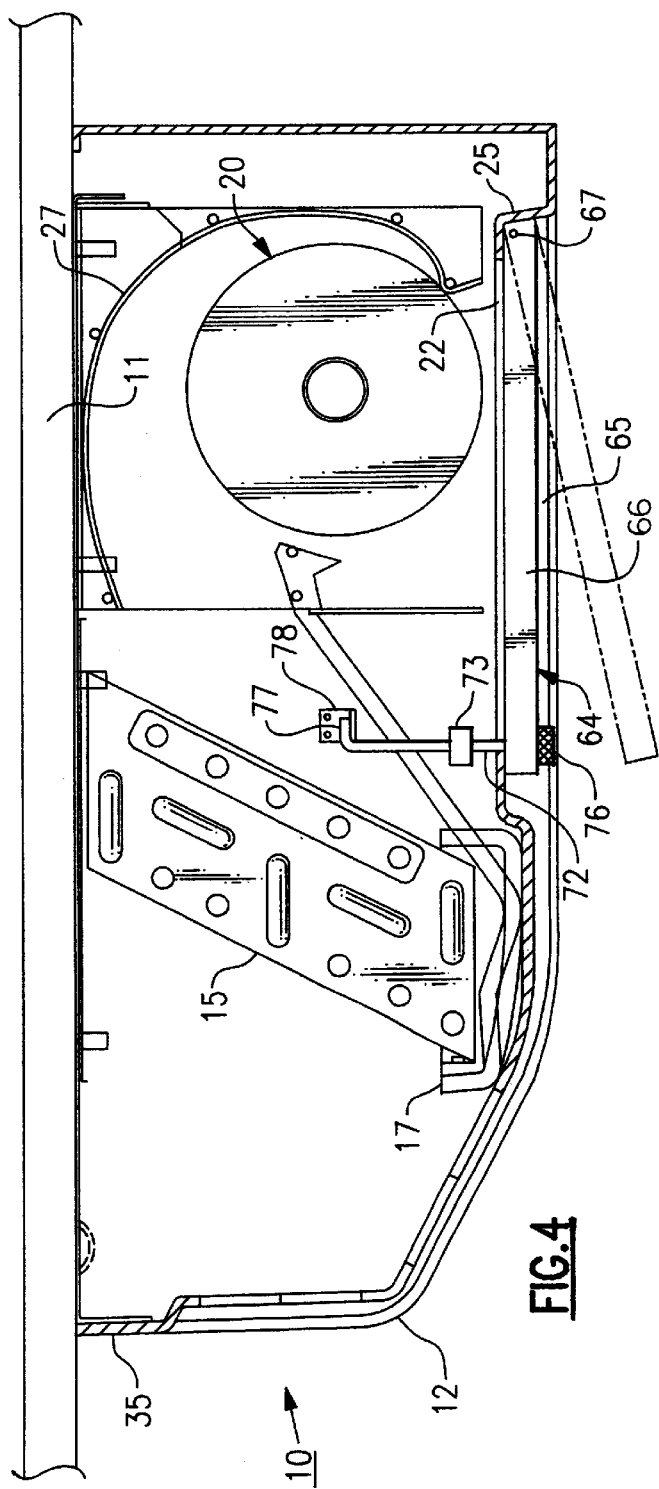
FIG. 4 is a side elevation in section of an evaporator unit that includes a further embodiment of the invention, showing a hinged grill assembly in a raised closed position.
Figure 5:
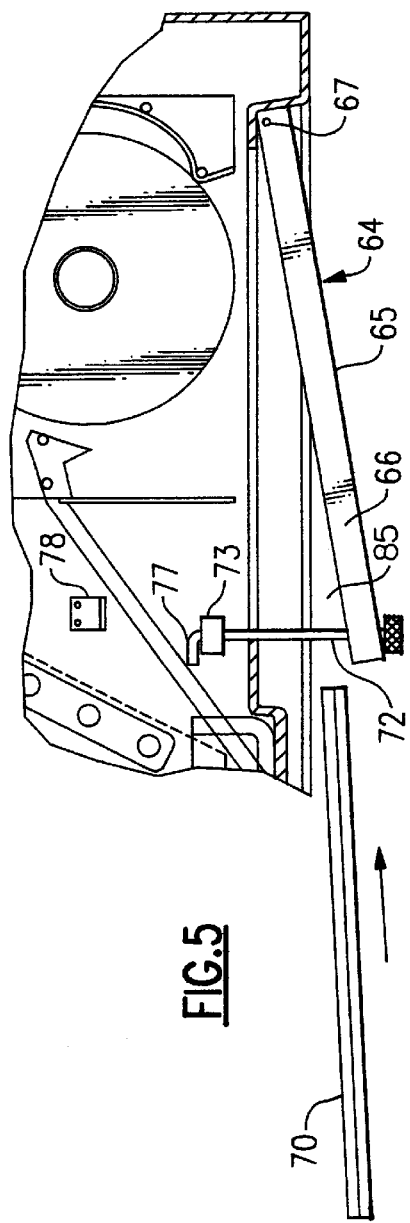
FIG. 5 is a partial side elevation of the unit shown in FIG. 4 further illustrating the hinged grill assembly in an open position.

Turning now to FIGS. 4 and 5, there is shown a further embodiment of the present invention wherein like numbers are used to identify like parts as previously described above with reference to FIG. 1. Here again, the cabinet contains a floor having a recessed section in which an air inlet opening is provided immediately beneath a transverse blower 38. In this embodiment of the invention, the grill assembly 64 includes a rectangular shaped grill 65 that forms the bottom wall of a rectangular shaped, open top tray 66. The tray contains upraised opposed side walls and end walls that are integral with the grill. The assembly contains a pivot pin 67 that is rotatably mounted in the side walls of the cabinet. The tray is dimensioned so that an air filter 70 can be drop loaded into the tray through the top opening in registration with the grill. The filter is similarly removed from the assembly through the open top of the tray.

Here again, the grill is equipped with rows of slim, elongated slits that will prevent small articles from being inserted into the blower region, but still provide a sufficient flow of return air to the unit so that the unit can operate at peak capacity when called upon to do so.

The end of the grill assembly opposite the hinged end rotatably contains a pair of spaced apart slide rods 72. The shank of each rod is slidably contained within a bearing block 73 that is pivotally retained in the housing. The distal end of each rod further includes an expanded head 76 having a slot formed therein so that a special tool may be inserted into the slot and the entire rod turned between a first position and a second position.

The proximal end of each rod further contains an eccentrically mounted lug 77 that can freely pass into engagement with a latching mechanism 78 and the air inlet unit is closed against the floor of the cabinet and the rods are in the first position. Turning the rods into the second position allows the lugs to engage the latching mechanism to lock the grill assembly in the fully up position as shown in FIG. 4.

Turning now to FIG. 5, the grill assembly is shown in an open position wherein the unit is permitted to swing down about the hinge to provide a limited opening 85 through which an air filter can be top loaded into the tray or removed therefrom. To drop the air inlet unit, the rods are rotated out of the second position into the first position. This releases the unit from the latching mechanism and allows the assembly to move down into the open position as illustrated in FIG. 5. When the air intake unit is in the fully open position, the lugs on the proximal end of the rods are arrested by the bearing blocks thus limiting the size of the grill assembly opening. As noted above, sufficient space is afforded to permit the filter to be easily passed into and out of the tray, but insufficient to permit ready access to the interior of the cabinet.

Preferably, the slot placed in the head of each rod is of the type that requires a special tool for engaging and turning the rod so that coins, nail files, screwdrivers or the like cannot be employed for this purpose.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A low profile compact evaporator unit suitable for use inside the passenger compartment of a small bus, said unit including
    an enclosed cabinet that is suspended from a ceiling inside of a passenger compartment of a small bus, said cabinet having a floor containing an air inlet opening whereby air for the passenger compartment is passed directly into said cabinet;
    an evaporator coil mounted in the forward part of the cabinet adjacent to an air outlet opening in a sidewall of said cabinet;
    a blower wheel mounted in said cabinet directly over said air inlet opening for drawing air into said cabinet through said air inlet opening and passing said air through the evaporator coil and out said air outlet opening along the ceiling of the passenger compartment;
    a non-removable grill covering said air inlet opening for denying access to said blower wheel through said grill; and
    a tray having a guide way located adjacent a limited access opening in said cabinet for removably supporting an air filter over said grill.

2. The unit of a claim 1 wherein said grill contains a series of narrow elongated slots each having a width of between $3/8$ and $1/2$ inches.

3. The unit of claim 1 wherein said grill is affixed to the floor of the cabinet by rivets.

4. The unit of claim 1 wherein said cabinet further includes a door located adjacent to said guideway that is hinged for movement between an open and a closed position whereby said air filter can be inserted and removed from said guideway when said door is placed in an open position.

5. The unit of claim 1 wherein said grill is integral with said guideway to establish a grill assembly.

6. The unit of claim 5 wherein said grill assembly is hinged along one edge in the floor of the cabinet whereby the assembly can rotate about said hinge between an open and closed position, a hanger means slidably contained in said cabinet for limiting the amount of rotation afforded said assembly between said open and closed position.

7. The unit of claim 6 wherein said hanger means includes a pair of spaced apart rods being slidably contained in said housing and latching means for engaging said rods when the assembly is in a closed position to secure the assembly in said closed position.

8. The unit of claim 7 that further includes stop means for engaging said rods and limiting the amount of movement afforded said assembly about said hinge.

9. The unit of claim 8 that further includes bearing means for slidably containing said rods within said housing.

* * * * *